United States Patent
Sparrow et al.

(10) Patent No.: US 6,911,937 B1
(45) Date of Patent: Jun. 28, 2005

(54) DIGITAL POLARIMETRIC SYSTEM

(75) Inventors: Mitchell J. Sparrow, Wayne, NJ (US); Joseph Cikalo, Nutley, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 1109 days.

(21) Appl. No.: 09/711,168

(22) Filed: Nov. 13, 2000

Related U.S. Application Data (60) Provisional application No. 60/164,947, filed on Nov. 12, 1999.

(51) Int. Cl.[7] .............................................. G01S 13/00
(52) U.S. Cl. ........................... 342/188; 342/13; 342/82; 342/83; 342/175; 342/195; 342/361
(58) Field of Search ................................ 356/364–370; 342/13–20, 82–103, 177, 149, 150–154, 175, 188, 189–197, 361–367; 333/1, 21 R, 21 A, 24 R, 24.1, 24.2, 24.3

(56) References Cited

U.S. PATENT DOCUMENTS

| | | | | |
|---|---|---|---|---|
| 3,581,242 A | * | 5/1971 | Lavedan ........................ 333/1 |
| 3,836,973 A | * | 9/1974 | Shnitkin et al. ............. 342/362 |
| 3,890,571 A | * | 6/1975 | Beyer ........................... 324/95 |
| 3,918,055 A | * | 11/1975 | Shimizu et al. ............. 342/188 |
| 4,053,882 A | * | 10/1977 | Van Etten ................... 342/188 |
| 4,118,125 A | * | 10/1978 | Gundermann ............... 356/368 |
| 4,323,898 A | * | 4/1982 | Barnes et al. ................. 342/90 |
| 4,323,899 A | * | 4/1982 | Barnes et al. ................. 342/90 |
| 4,520,362 A | * | 5/1985 | Charlot ........................ 342/361 |
| 5,235,340 A | * | 8/1993 | Shea ........................... 342/188 |
| 5,420,590 A | * | 5/1995 | Shea ........................... 342/188 |

* cited by examiner

Primary Examiner—Bernarr E. Gregory
(74) Attorney, Agent, or Firm—Edell, Shapiro, & Finnan, LLC (57) ABSTRACT

A digital polarimeteric system employs a signal time stretching technique and digital signal processing of the time-stretched signal to accurately measure the polarization of a received RF signal with commercially available digital hardware. A superheterodyne receiver down converts received RF signal components to IF, and analog-to-digital converters sample the signal components at much lower sampling rates than would normally be required to accurately measure the signal polarization. Each signal sample is "time stretched" by storing each sample in M locations in a memory, such that N samples occupy M×N memory locations. A digital signal processor applies incremental phase shifts to the digital samples until a phase-shifted combination of the digital samples yields a minimum null output. The phase shifts producing the minimum null identify the polarization of the received signal. The stretching and digital processing yield the required number of samples per cycle of the received signal for accurate polarization measurement, thus effectively increasing the digital sampling frequency. Because each sample is stored in M memory locations, each incremental phase shift corresponds to $1/M^{th}$ of the actual sampling interval, thereby providing the high phase resolution required to accurately measure polarization.

52 Claims, 6 Drawing Sheets

DIGITAL POLARIMETRIC SYSTEM

CROSS REFERENCE TO RELATED APPLICATION

This application claims priority from U.S. Provisional Patent Application Ser. No. 60/164,947 entitled "Digital Polarimetric System," filed Nov. 12, 1999. The disclosure of this provisional patent application is incorporated herein by reference in its entirety.

BACKGROUND OF THE INVENTION

1. Field of the Invention

The present invention relates to electronic warfare (EW) systems that use polarimeters to measure polarization of a received radar signal and to transmit electronic counter measures (ECM) signals with a preferred polarization and, more particularly, to a digital implementation of such a polarimeter.

2. Description of the Related Art

Ground-based and airborne radar systems have long been used to detect and track hostile targets, such as aircraft and missiles. Typically, a radar system transmits RF signals, such as a sequence of pulses, toward the target. The surface of the target reflects at least some portion of the incident signal energy back toward the radar antenna where the pulse echo is detected, allowing the radar system to determine the target's range, angle and velocity.

To counter the effectiveness of such radar systems, electronic warfare (EW) systems attempt to interfere with radars signals by generating electronic counter measures (ECM) signals designed to confuse, mislead or overwhelm the radar system. By accurately determining the polarization of an arriving radar signal, an EW system can transmit a signal with the same polarization back to the radar system to interfere with the echo signal, or transmit a signal with an orthogonal polarization to deceive or jam the radar system. EW systems have relied on polarimeters to accurately measure the polarization of received radar signals and to control the polarization of the ECM signals transmitted back to the radar system.

In systems presently in operation, only one polarimeter is typically used. The polarimeter processes low power level signals received from the radar and imparts a desired polarization to the high power RF signal from the EW system transmitter. To operate on the transmitter output signals, the polarimeter design must be based on hardware components with a capacity to handle high power. Thus, conventional polarimeters are bulky, heavy and costly devices that dissipate as much as fifty percent of the RF signal power, adversely affecting the EW system performance. Consequently, the traditional polarimeter design is not affordable for many small or low-cost EW systems.

With the more recent advent of power amplification technology devices, i.e., Microwave Power Modules (MPM) and Gallium Arsenide Monolithic Microwave Integrated Circuits (GaAs MMIC) chips for active aperture antennas, new analog hardware architectures for future EW systems could be contemplated. In the new architecture, the single bulky polarimeter is replaced with two MMIC low-power polarimeters. A receive polarimeter, involving a four terminal network, is inserted into the receiver line and measures the polarization of intercepted signals. A transmit polarimeter is positioned at the input to a pair of power amplifiers and controls the polarization of the transmitted signal based on measures from the receive polarimeter. In the receive polarimeter, the polarization measurement accuracy must be very high in order to achieve a high level of jamming performance, with tolerable errors being less than 0.5 RF degrees. A null adaptive tracking technique accurately measures the received signal's polarization by phase shifting the vertical and horizontal polarization components of the signal and developing sum and difference measurement from combinations of the phase-shifted components. The phase shifts producing a minimum or "null" difference/sum ratio identifies the polarization of the received signal. Performance of the null adaptive tracker is rated in terms of an achieved null depth, with a deeper null representing greater performance.

While low-power polarimeters employing a null adaptive tracking technique overcome some of the disadvantages associated with high-power polarimeters, the low-power polarimeter design is still based on the architecture of analog components. Analog polarimeters typically employ hybrid junctions for combining the received signal components. These hybrid junctions may permit some degree of RF cross leakage to corrupt the combined signals, thereby complicating the task of achieving a deep null and limiting performance of the analog polarimeter. Moreover, the feedback mechanism within the null adaptive tracker of the analog polarimeter requires a significant amount of time to reduce the difference signal to zero, since fresh signal samples (i.e., pulses) are required for each iteration performed by the tracker.

While a polarimeter based on digital technology could potentially avoid these problems, the extraordinarily high digital sampling rates that would be required to accurately measure polarization are not feasible with current technology. Accordingly, there remains a need for a reliable, inexpensive and compact polarimetric system that overcomes the performance limitations of analog systems using currently available digital technology.

SUMMARY OF THE INVENTION

Therefore, in light of the above, and for other reasons that become apparent when the invention is fully described, an object of the present invention is to make digital polarimetry feasible with commercially available hardware.

A further object of the present invention is to reduce manufacturing and maintenance costs of polarimetric systems.

Yet a further object of the present invention is to eliminate performance degradation caused by RF signal leakage in polarimetric systems.

A still further object of the present invention is to avoid the use of high-power polarimetric devices that dissipate significant power.

Another object of the present invention is to minimize the size and weight of polarimetric systems.

Yet another object of the present invention is to increase the reliability of polarimetric systems.

Still another object of the present invention is to improve polarimetric system performance with faster signal polarization tracking.

It is a further object of the present invention to minimize polarmetric system power requirements.

The aforesaid objects are achieved individually and in combination, and it is not intended that the present invention be construed as requiring two or more of the objects to be combined unless expressly required by the claims attached hereto.

In accordance with the present invention, a digital polarimeteric system employs a signal time stretching technique and digital signal processing of the time-stretched signal to accurately measure the polarization of a received RF signal with commercially available digital hardware. The received RF signal components are down-converted to IF, and analog-to-digital converters (ADCs) sample the signal components at much lower sampling rates than would otherwise normally be required. Each signal sample is "time stretched" by storing each sample in M memory locations, such that N samples occupy M×N memory locations. Phase shifts analogous to those applied in a conventional analog polarimeter are then applied to the samples in one-sample increments until the phase shifts yielding the deepest null. The phase shifts producing a deepest "null" (minimum difference/sum ratio) identify the polarization of the received signal. Because each sample is stored in M memory locations, each incremental phase shift corresponds to $1/M^{th}$ of the actual sampling interval, thereby providing the high phase resolution required to accurately measure polarization. The stretching and digital processing yield the required number of samples per cycle of the received signal for accurate polarization measurement, thus effectively increasing the digital sampling frequency. Accordingly, implementation of the time stretching technique makes the digital polarimeter feasible with currently available analog-to-digital converters. Using commercially available digital hardware, the digital implementation makes polarimetric systems affordable to more EW systems than the more expensive conventional analog polarimeters.

In accordance with an exemplary embodiment of the present invention, it is demonstrated that a digital sampling rate requirement of 7.2 GHz can be satisfied with a sampling rate equal to, or even lower than, 200 MHz. The polarization measurement task is accomplished entirely in the digital domain, requiring only two signal pulses to establish tracking. The digital implementation also avoids potential performance degradation caused by cross leakage signals typically present in conventional analog polarimeters.

The digital polarimeter of the present invention is more compact, lower in weight and more power efficient than conventional high-power analog polarimeters. The digital design of polarimeter of the present invention also offers the potential of a more reliable system, with a greater mean time between failures.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

The following detailed explanations of the figures and of the preferred embodiments reveal the methods and apparatus of the present invention. A general null adaptive polarization tracking technique is described in connection with the block diagram of an analog polarimetric system 10 employing a feedback loop shown in FIG. 1. System 10 includes an analog polarimeter 12 which separately receives the horizontal component (signal A) and the vertical component (signal B) of a received signal, such as series of radar pulses. The perceived polarization of a received radar signal is a function of the orientation of the antenna of the EW system; thus, the portion of the received signal constituting the "horizontal" component and the portion constituting the "vertical" component is dependent upon the present orientation of the EW antenna. For example, an airborne EW system will typically receive a vertically polarized signal from a ground-based radar. How the EW antenna "sees" this vertically polarized signal is, however, a function of the antenna's orientation. Thus, if the antenna is rotated (rolled) ninety degrees about a roll axis relative to a level reference, the vertically polarized signal may appear as a horizontally polarized signal to the EW system.

Figure 1:
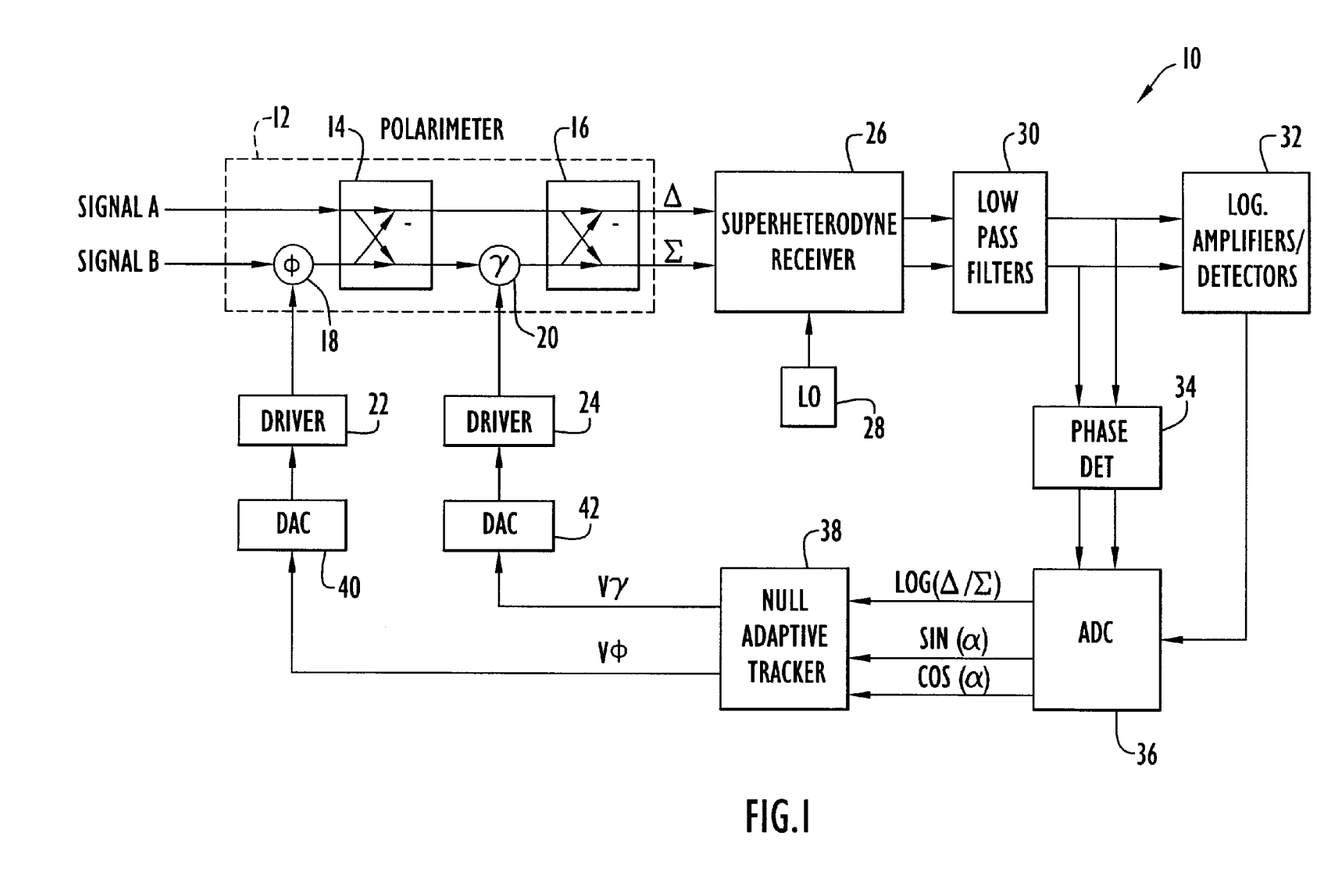
FIG. 1 is a block diagram illustrating a null adaptive polarization tracker of an analog polarimetric system.

Polarimeter 12 includes two microwave frequency hybrids 14 and 16 that produce in-phase and 180 degrees out-of-phase signals, and two line-imbedded phase shifters 18 and 20 (labeled φ and γ in FIG. 1). Specifically, signal A is supplied directly to an input of hybrid 14 and signal B is phase shifted φ degrees by phase shifter 18 prior to being supplied to hybrid 14. Hybrid 14 generates a difference output (signal A minus the phase-shifted signal B) and a sum output (signal A plus phase-shifted signal B). The difference output of hybrid 14 is supplied as an input to hybrid 16, while the sum output of hybrid 14 is phase-shifted γ degrees by phase shifter 20 prior to being supplied to hybrid 16. Hybrid 16 generates a difference output (the sum input minus the phase-shifted difference input) and a sum output (the sum input plus the phase-shifted difference input). The difference output of hybrid 16 is supplied to a difference port (Δ) of polarimeter 12, while the sum output of hybrid 16 is supplied to a sum port (Σ) of polarimeter 12.

A control network adjusts phase shifters 18 and 20 to reduce the output of the difference port (Δ) of polarimeter 12 to zero (null). More specifically, a null adaptive signal processing technique is used to derive voltage levels for phase shifter drivers 22 and 24 to respectively adjust the phase shifters 18 and 20 to induce a null (Δ=0) at the polarimeter difference port output. When the deepest null (i.e., the smallest value of Δ/Σ) is achieved, the polarization measurement process is complete. Values of φ and γ yielding the deepest null represent measures of the phase and amplitude difference between the horizontal and vertical components (signals A and B) of an intercepted radar signal. The values of φ and γ are varied until the deepest null is found. Generally, φ and γ are varied one at a time sequentially, although both phases can be varied simultaneously.

The input signals A and B supplied to the polarimeter are at the microwave frequency. To develop voltage levels for adjusting the phase shifters, the polarimeter difference (Δ) and sum (Σ) output signals must first be down converted to a suitable intermediate frequency (IF). A dual channel superheterodyne receiver 26 mixes each of the sum and difference signal with a signal supplied by a local oscillator 28 to convert the sum and difference signals to a suitable IF. After down conversion, a low pass filter 30 smooths the IF sum and difference signals to form clean sinusoidal outputs. The sinusoidal IF sum and difference signals are then supplied to a phase detector 34 and to a logarithmic amplifier/detector network 32. Logarithmic amplifier/detector network 32 produces the ratio log(Δ/Σ), which is digitized by analog-to-digital converter (ADC) 36 and fed to a null adaptive processor 38.

Phase detector 34 measures the phase difference α between the smoothed IF sum and difference signals, and generates output signals (cos α) and (sin α). These signals, which lend direction sense to the null adaptive feedback process, are also digitized by ADC 36 and supplied to null adaptive tracker 38. Using the signals received from the logarithmic amplifier/detector 32 and phase detector 34, null adaptive tracker 38 develops digital voltage levels $V_\phi$ and $V_\gamma$ in the digital domain. Voltages levels $V_\phi$ and $V_\gamma$ are then converted to analog voltage signals by digital-to-analog converters (DAC) 40 and 42, respectively. The analog voltage signals are respectively supplied to phase shifter drivers 22 and 24 to close the feedback loop.

It will be appreciated that digital technology devices are used in the instrumentation of the analog polarimeter network shown in FIG. 1 (i.e., ADC 36 and DACs 40 and 42), allowing the tracker to operate in the digital domain. Nevertheless, the polarimeter 12 itself is an analog device employing hybrid junctions to combine the RF input signals. Likewise, signal amplification and detection are performed in the conventional analog domain. With the analog polarimeter, a significant amount of time is required to reduce the polarimeter's Δ port output to zero, because a number of fresh signal samples (pulses) is required for each iteration of the tracker. Further, when the hybrids of the analog polarimeter produce leakage signals, a deep null (translating to good performance) becomes difficult to achieve.

An impediment to the development of a practical digital polarimeter has been a lack of high speed analog-to-digital converters (ADCs) capable of operating at sampling rates sufficiently high to accurately measure polarization. The required sampling speed is generally determined as follows. Assume that the IF frequency is on the order of 10 MHz. To measure the polarization with a precision of at least 0.5 degrees (corresponding to a null depth of −41 dB), the signal would have to be sampled at 0.1/7200 μsec. intervals (7,200 MHz), with a ten-bit ADC. (One cycle of the IF signal, spanning 0.1 μsec, is divided in 7200 slices, with 0.00013889 μsec.=0.5 degrees.) This task plainly cannot be performed with the current technology devices.

The present invention makes it possible to digitally perform the function of an analog polarimeter by employing a signal time stretching technique and digital signal processing of the time-stretched signal, and digital polarimetry becomes feasible with commercially available analog-to-digital converters (ADC) operating at much lower sampling rates than would otherwise normally be required. Polarization measurement performance of the digital polarimeter of the present invention is comparable to that of conventional polarimeters operating at higher sampling rates. The polarization measurement task is accomplished entirely in the digital domain, requiring only two signal pulses to establish tracking.

Figure 2:
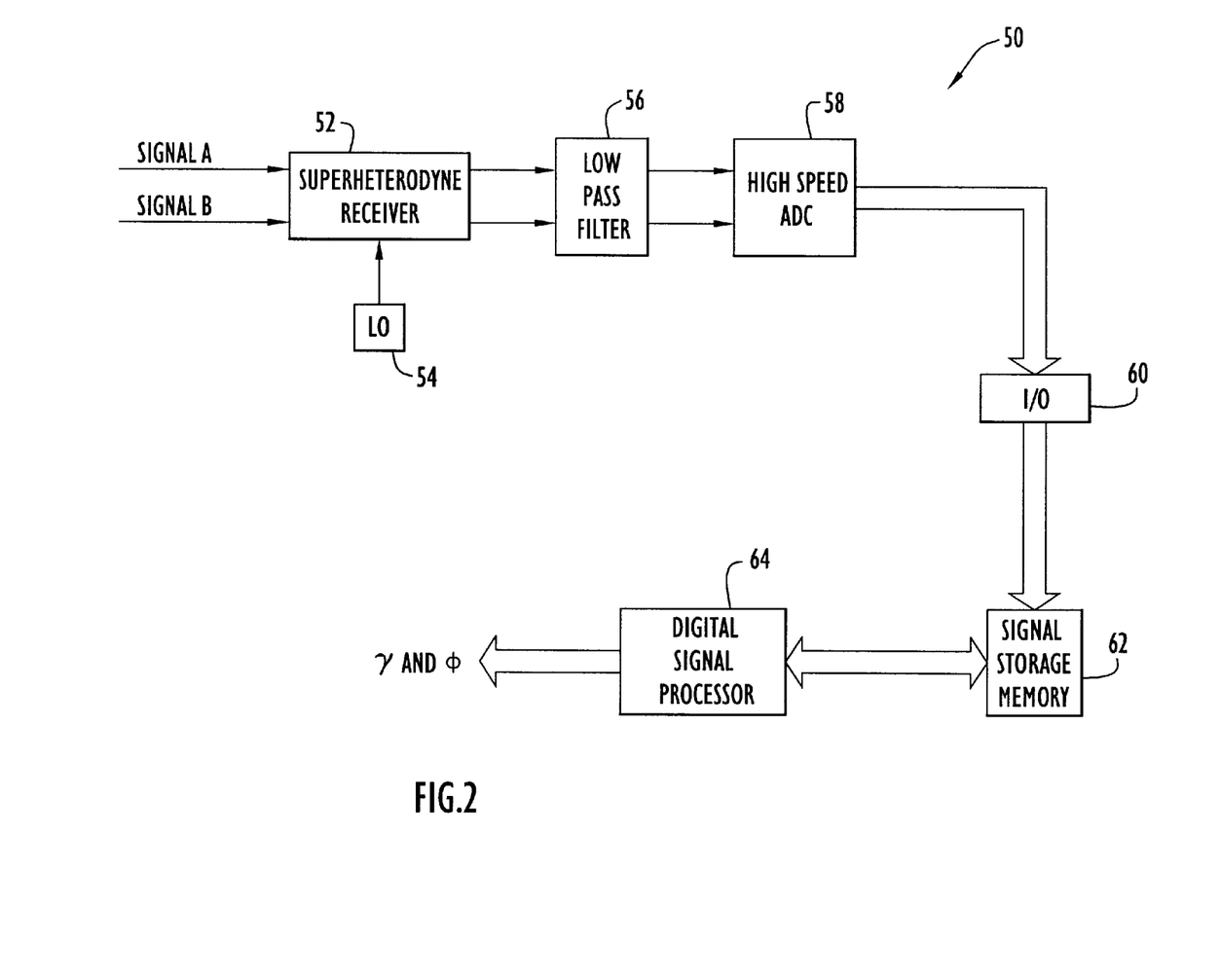
FIG. 2 is a block diagram illustrating a digital polarimetric system in accordance with an exemplary embodiment of the present invention.

A block diagram of an elementary polarimetric system design 50 in accordance with an exemplary embodiment of the present invention is shown FIG. 2. The input signal components (i.e., horizontal polarization component, signal A, and the vertical polarization component, signal B) generally are at the microwave frequency. First, the signals are down converted in a dual channel superheterodyne receiver 52 to a suitable intermediate frequency (IF) such as 10 MHz. After down conversion, the receiver output signals are passed through a pair of low pass filters 56 to smooth the receiver output signals, thereby forming clean sinusoidal outputs. The sinusoidal IF signals are supplied to two ten-bit amplitude-sampling analog-to-digital converters (ADC) 58, where the IF signals are converted to digital signals. The digitized signals are directed, via an input/output (I/O) device 60 (e.g., a buffer), to a digital signal processor memory 62 for storage.

A digital signal processor (DSP) 64 (e.g., a microprocessor) is programmed to process the digital signal data to search for the deepest null. More specifically, a computer program operates on the stored digital signal data to find values of φ and γ that produce a null condition. The program is capable of computing the same signal-processing task that is normally performed by the analog polarimeter. The nature of this signal processing can be understood from examination of the analog polarimeter outputs which are defined as:

$$\Delta = A - Be^{j(\beta+\phi)} - \{Ae^{j\gamma} + Be^{j(\gamma+\beta+\phi)}\} \qquad (1)$$

$$\Sigma = A - Be^{j(\beta+\phi)} + \{Ae^{j\gamma} + Be^{j(\gamma+\beta+\phi)}\} \qquad (2)$$

where A and B are the signal amplitudes, β is the phase difference between signals A and B, and φ and γ are the polarimeter phase values. In a conventional design polarimeter operation, values of γ and φ are varied until the A port output is nulled (Δ=0).

The processing task to be performed by DSP 64 can be defined by examining the action of each element of the polarimeter. The sum and difference polarimeter outputs, as defined by equations (1) and (2), can be structured with the digital data stored in the processor memory. In particular, the difference and sum polarimeter output signals for each sample i (in this example, 720 samples per cycle) are calculated as:

$$\Delta(i,j,k) = A(i) - B(i+k) - \{A(i+j) + B(i+j+k)\} \qquad (3)$$

$$\Sigma(i,j,k) = A(i) - B(i+k) + \{A(i+j) + B(i+j+k)\} \qquad (4)$$

where A(i) is the $i^{th}$ sample in the time-expanded sequence of stored A samples, A(i+k), is the i+$k^{th}$ A sample, etc., and k and j represent an integer number of one-sample time shifts from time reference i (in this example, k and j can be varied from 0 to 719).

The two equations, (3) and (4), define the architecture and the steps required to conduct computation of Δ and Σ within DSP 64. The computation task includes the arithmetic summing operations of selecting the contents of specific memory locations and loading the selected values into accumulators. The processing performed in DSP 64 is explained in connection with FIG. 3.

Figure 3:
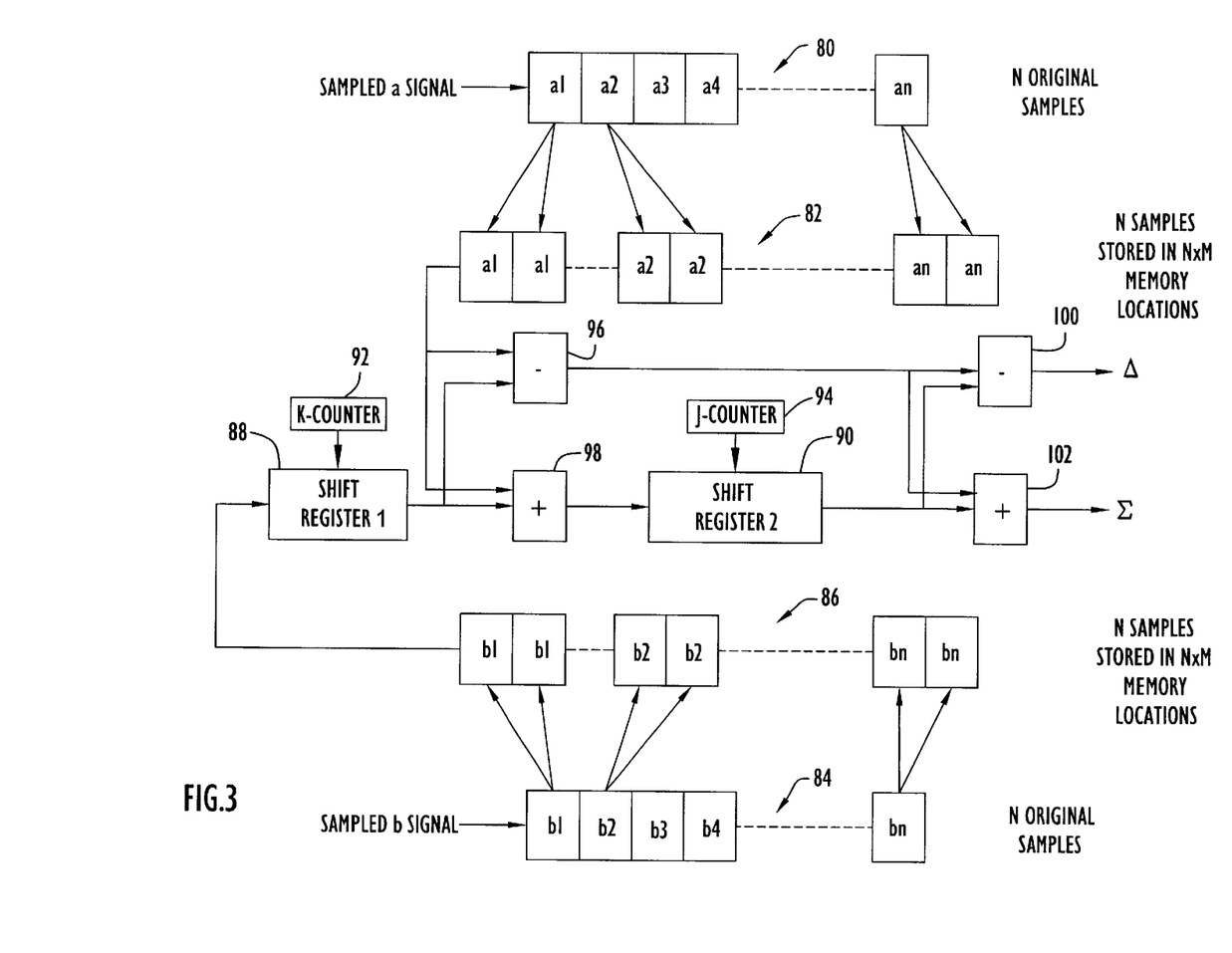
FIG. 3. is a diagram illustrating the data expansion and processing sequence performed by a digital signal processor in accordance with the exemplary embodiment of the present invention.

In order to achieve a desired null depth, each cycle of the IF signal must be sampled at appropriate time intervals. If the null depth is to be greater 41 dB, then according to the null depth formula 20log(σ/57.3), the phase resolution σ must be at least 0.5 degrees. Assuming the IF frequency is 10 MHz, the required sampling rate must be 7.2 GHz. No ten-bit ADC devices operate at such a high speed. Sampling the IF signal at a much lower rate than 7.2 GHz, the present invention nevertheless achieves nulls just as deep as conventional analog polarimeters. More particularly, in accordance with the present invention, the IF input signals A and B are sampled at a rate as low as approximately twenty times per cycle. Assuming an IF of 10 MHz, the sampling rate is 200 MHz. At the rate of twenty samples per cycle, each sample represents the signal at eighteen-degree intervals. In FIG. 3, the sampled signal A is shown as a sequence 80 of N original samples $a_1, a_2, a_3, \ldots, a_n$. Likewise, the sampled signal B is shown as a sequence 84 of N original samples $b_1, b_2, b_3, \ldots, b_n$. For purposes of illustration, data spanning only one cycle of signal samples is shown in FIG. 3.

In the digital signal processor 64, the signal time parameter is stretched to yield signal data with an equivalent 0.5 degree phase resolution. This fine phase resolution is developed by first performing a prescribed operation on the stored signal data. The operation involves "stretching" the signal data. More specifically, as shown in FIG. 3, each of the N samples of the signal A ($a_1, a_2, a_3, \ldots, a_n$) is stored in M locations, increasing the total number of A signal samples to M×N, where N is the number of the real, original samples (in this example, N=20). Sample $a_1$ is stored in the first M memory locations, sample $a_2$ is stored in the next M memory locations, and each subsequent sample is stored in M consecutive memory locations, forming an M×N sequence in memory locations 82. Similarly, each of the N samples of the signal B ($b_1, b_2, b_3, \ldots, b_n$) is stored in M locations, increasing the total number of B signal samples to M×N, where N is the number of the real, original samples. Sample $b_1$ is stored in the first M memory locations, sample $b_2$ is stored in the next M memory locations, and each subsequent sample is stored in M consecutive memory locations, forming an M×N sequence in memory locations 86.

The value of M is derived from the required number of samples per cycle divided by the actual number of samples. In the foregoing example, the number of actual samples per cycle is 20, and the number of required samples is 720; thus, M=720/20=36. In essence, the time span of a single signal cycle is stretched to 3.6 μsec (36×0.1 μsec). Sampling the stretched version of the signal at 200 MHz, yields seven hundred and twenty (720) 0.5 degree samples. As shown in FIG. 3, the data expansion for M=36 results in twenty signal A samples being redistributed to N×M=720 memory locations 82. In a similar manner, the twenty signal B samples are redistributed to 720 additional locations 86. The individual locations contribute to the computed signal data equivalent of 0.5° phase resolution.

Once the time-expanded samples of signals A and B are stored in the M×N memory locations 82 and 86, digital signal processor 64 begins computing the difference (Δ) and sum (Σ) in accordance with equations (3) and (4) to locate the values of φ and γ is represented. Specifically, a first shift register 88 receives the signal B samples and shifts the timing of the samples by a number of samples k indicated by a counter K (92). DSP 64 performs a subtraction operation 96 to compute a first-stage difference, by subtracting the B samples (time shifted by k samples) from the A samples (i.e., first-stage difference=A(i)−B(i+k)). An addition operation 98 computes a first-stage sum by adding the time-shifted B samples to the A samples (i.e., first-stage sum=A(i)+B(i+k)).

A second shift register 90 receives the first stage sum samples and shifts the timing of the first stage sum samples by a number of samples j indicated by a counter J (94). Another subtraction operation 100 is then performed to compute output difference signal (Δ) for sample i as the difference of the first-stage difference and the time-shifted first-stage sum, or:

$$\Delta(i,j,k) = A(i) - B(i+k) - \{A(i+j) + B(i+j+k)\} \quad (3)$$

Likewise, another addition operation 102 computes the output sum signal (Σ) for sample i by adding first-stage difference and the time-shifted first-stage sum, or:

$$\Sigma(i,j,k) = A(i) - B(i+k) + \{A(i+j) + B(i+j+k)\} \quad (4)$$

At each value of j and k (i.e., for particular phase shifts φ and γ), the output difference measurement Δ is the aggregation of all of the individual sample differences Δ(i,j,k) for all of the P signal samples stored in the memory (M×N samples per cycle). Likewise, the output sum Σ is the aggregation of all the P individual sample differences Σ(i,j,k).

$$\Delta(j, k) = \sum_{i=1}^{P} \Delta(i, j, k) \quad (5)$$

$$\Sigma(j, k) = \sum_{i=1}^{P} \Sigma(i, j, k) \quad (6)$$

Shift registers 88 and 90 essentially shift the relative phase of samples signals A and B past each other in the same manner that phase shifters 18 and 20 (φ and γ) shift the RF signals in the conventional analog polarimeter shown in FIG. 1. In the exemplary embodiment, the original digital samples occur at 18° intervals. Without time expansion, each shift of the shift registers would result in an 18° phase shift. However, with time expansion, each sample has been stored in M consecutive memory locations. Consequently, each shift of shift registers 88 and 90 represents a shift of only $1/M^{th}$ of time relative to the original sampling interval, or equivalently, a phase shift of 0.5° rather than 18°, and shifting of the registers causes the sequences to slide past each other at this final angular resolution. Thus, shifting with the time-expanded sample sequences occurs at the fine resolution required to accurately determine the polarity of the intercepted RF signal.

As with the analog polarimeter, the objective of the digital polarimeter is to find a minimum value for the ratio (Δ/Σ). The first shift register 88 of the digital polarimeter shown in FIG. 3 introduces a phase shift φ (corresponding to the value supplied by K counter 92), while the second shift register introduces a phase shift γ (corresponding to the value supplied by J counter 94) in a manner analogous to phase shifters 18 and 20 of the analog polarimeter shown in FIG. 1. Thus, finding the correct values for φ and γ is a matter of identifying the number of shifts k of shift register 88 and the number of shifts j of shift register 90 that minimizes the output ratio Δ(j,k)/Σ(j,k) (i.e., the deepest null).

To determine the values of k and j that yield the minimum the output ratio Δ(j,k)/Σ(j,k), upon receiving a radar signal pulse, K counter 92 is initialized to k=0, and J counter 94 is initialized to j=0. The value of phase shift φ is first varied by incrementing the value of k (each increment corresponding to 0.5°), while holding the value of j at 0 (γ=0°). At each value of k, the sample difference values Δ(i,j,k) for all samples i are aggregated to yield Δ(j,k), and the sample sum values Σ(i,j,k) for all samples i are aggregated to yield Σ(j,k). The value of k is increased until a saddle point is reached in the value of the output ratio Δ(j,k)/Σ(j,k). That is, as k initially increases, the value of the output ratio Δ(i,j,k)/Σ(j,k) will decrease as the phase shift φ approaches the correct value. Once the increasing value of k causes the corresponding phase shift to exceed the correct value of φ, the output ratio Δ(j,k)/Σ(j,k) will again begin to increase, at which point the minimum output ratio and corresponding phase shift φ have been identified. The value of k is then fixed at the value producing the minimum output ratio (i.e., the saddle point), and the value of j is varied to find the phase shifty.

As with index k, the value of j is increased until a saddle point is reached in the value of the output ratio Δ(j,k)/Σ(j,k). As j initially increases, the value of the output ratio Δ(j,k)/Σ(j,k) will decrease as the phase shift γ approaches the correct value. Once the increasing value of j causes the corresponding phase shift to exceed the correct value of γ, the output ratio Δ(j,k)/Σ(j,k) will again begin to increase, at which point the minimum output ratio and corresponding phase shift γ have been identified.

The identified values of φ and γ yielding the deepest null (minimum Δ(j,k)/Σ(j,k)) represent measures of the phase and amplitude difference between the horizontal and vertical components (signals A and B) of the intercepted RF signal. Consequently, once φ and γ have been determined, these phases can be used to transmit a signal of a particular polarization back to transmitting radar system. For example, if the EW system transmits an RF signal at a matched polarization (i.e., the same polarization detected), the EW signal interferes directly with the returning radar signal. To jam a radar system employing a monopulse technique for measuring the angle to a target, the EW system may transmit a signal of orthogonal polarization, wherein the horizontal and vertical components are inverted relative to the received radar signal.

As will be appreciated from the foregoing description, because the digital signal samples are stored, the same samples can be used again and again as the values of φ and γ are adjusted to find the deepest null. This capability is to be contrasted with the analog approach in which a particular signal measurement can be used only once, thereby requiring a new measurement to attempt a further adjustment in the values of φ and γ. Consequently, the digital polarimetric system of the present invention requires only one pulse to figure determine the polarization of the received signal, rather than multiple signal measurements.

After initially determining the received signal's polarization from one pulse, the polarization measurement can be updated by repeating the process at a predetermined interval. For example, every tenth pulse can be used to update and fine tune the polarization determination. With these updates, since the polarization is known to within a certain accuracy, it becomes unnecessary to search through all values of k and j. Accordingly, values of k and j are varied only through a relatively narrow range of increments greater than and less than the previously determined values of k and j (the range being determined by the statistical accuracy of the previous values at the time of the update). If necessary, the initial search through all values of k and j can be repeated at the beginning of each intercepted radar dwell.

Optionally, to narrow the initial search range for k and j, the output signals from low pass filter 56 (FIG. 3) can be supplied to a phase detector (not shown) to determine relative phase angle β between the two signal components. The phase detector generates sine and cosine functions of the relative phase angle β. The sin(β) and cos(β) functions can then be digitized and used to establish initial estimates for the values of k and j.

To validate operation of the invention, a small-scale computer program was developed. The program was used to simulate performance of a digital polarimeter model whose design is based on the signal processing technique of the present invention. Two polarimeter models are incorporated in the program: one represents an ideal analog network polarimeter, and the second represents a digital version of the analog polarimeter. Outputs, 20log(Δ/Σ), of the digital polarimeter and that of the analog polarimeter are graphically presented in FIGS. 4–6 for sampling rates of twenty, twenty-five and forty times the intermediate frequency (IF).

Figure 4:
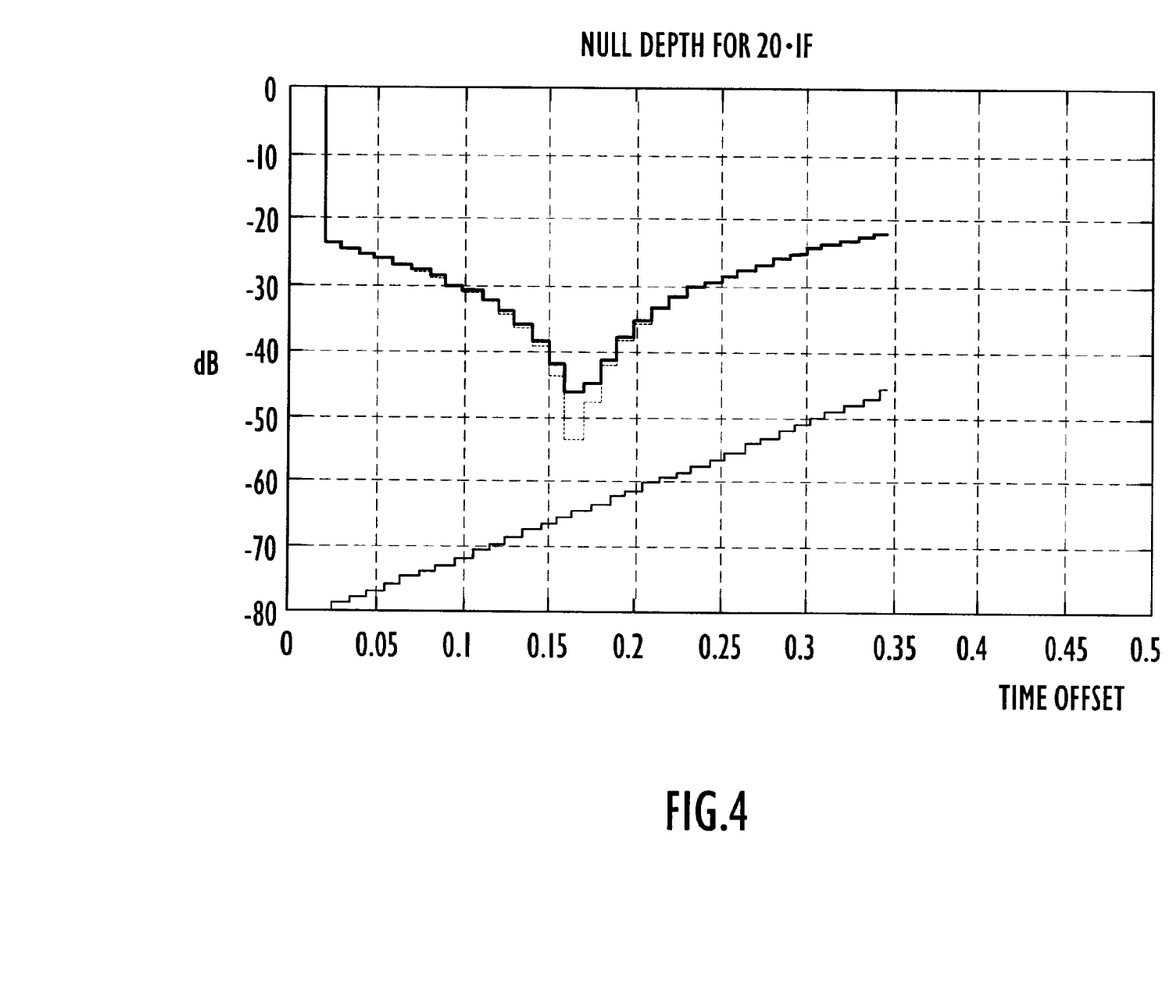
FIG. 4 is a graph comparing the null depth performance of an ideal analog network polarimeter to the digital polarimeter of the present invention with a digital sampling rate twenty times the intermediate frequency.
Figure 5:
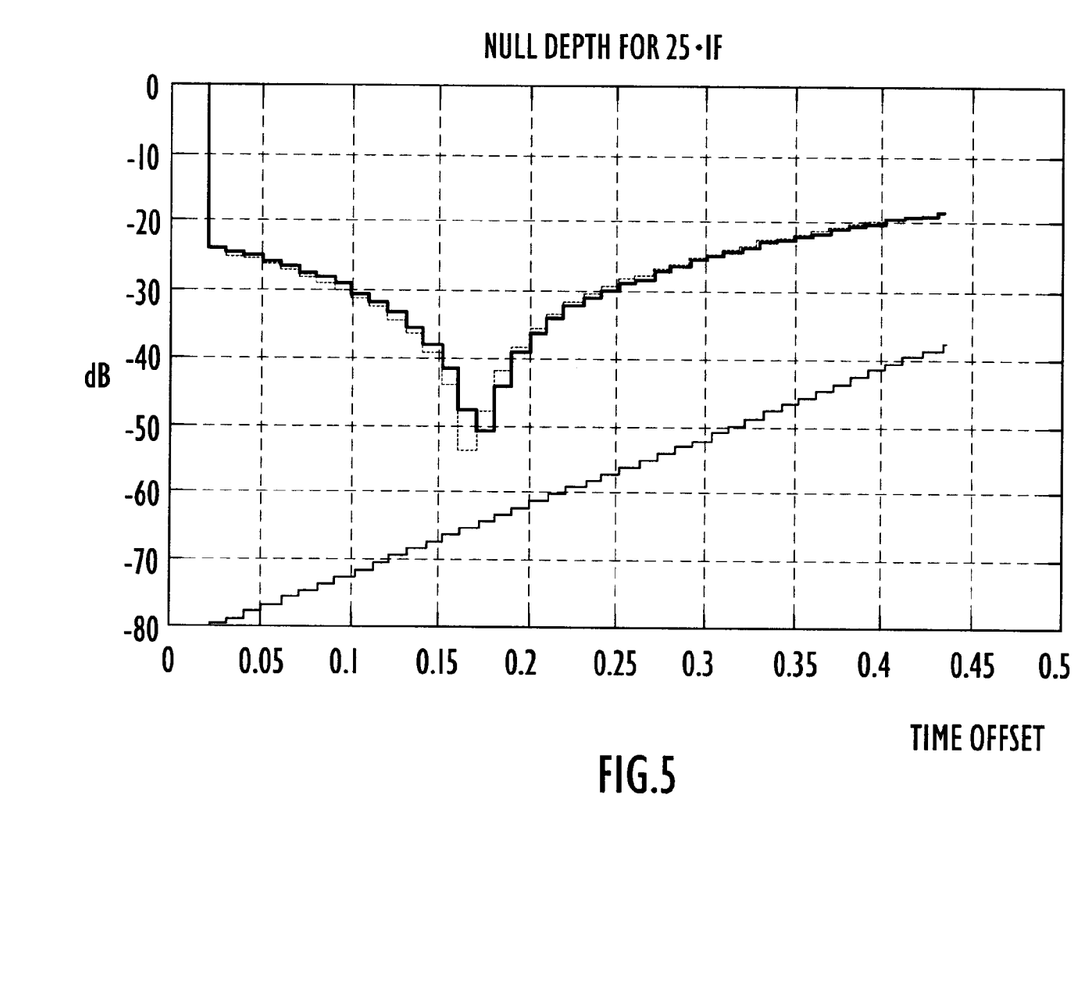
FIG. 5 is a graph comparing the null depth performance of an ideal analog network polarimeter to the digital polarimeter of the present invention with a digital sampling rate twenty-five times the intermediate frequency.
Figure 6:
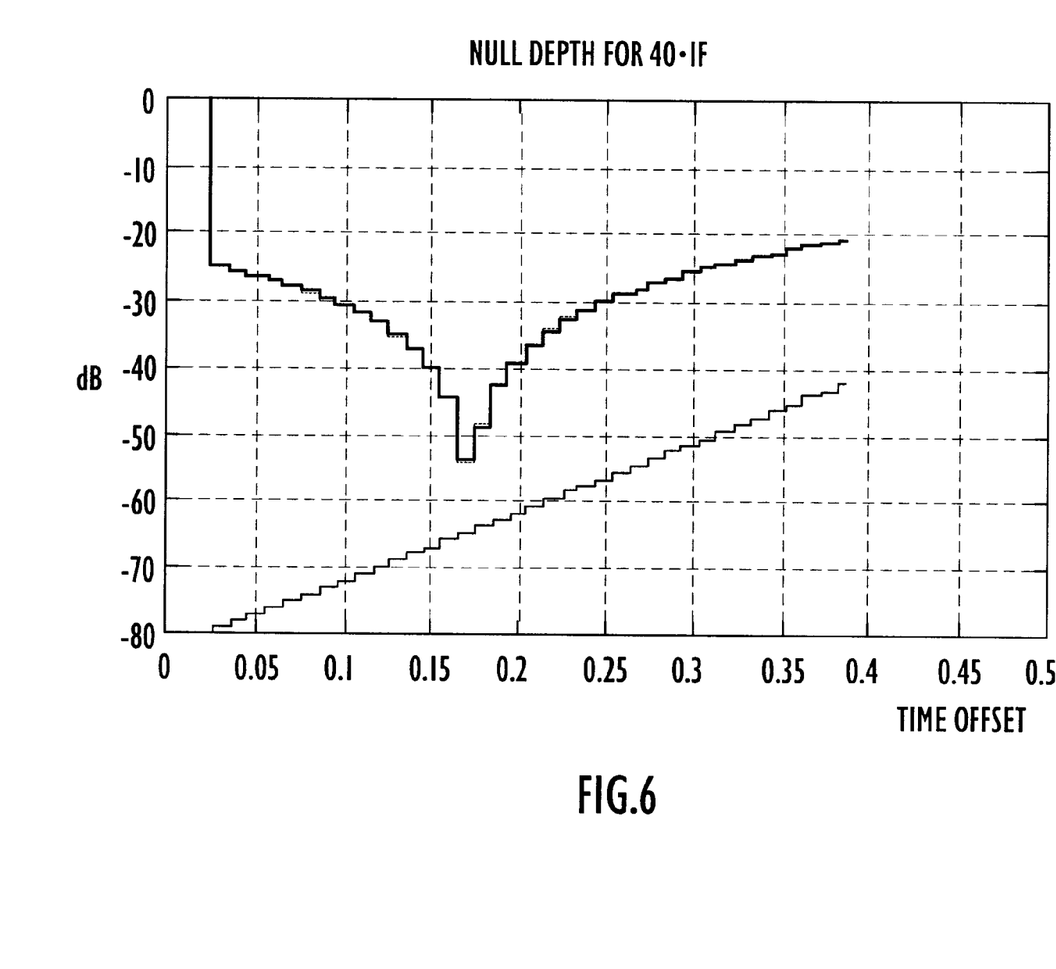
FIG. 6 is a graph comparing the null depth performance of an ideal analog network polarimeter to the digital polarimeter of the present invention with a digital sampling rate forty times the intermediate frequency.

Performance of the technique of the present invention is validated by a comparison of the analog and digital outputs of the simulation program. In the simulation, the two polarimeter models are operated in parallel and their outputs (20log(Δ/Σ)), as a function of φ, are shown. To simplify the illustrated results, the φ phase (time delay) is varied over the 25° region that includes the null. The phase sweep begins at a point 7° prior to the null position, while the γ value remains fixed. The outputs of both models are superimposed on the graph over a vertical scale spanning 0 to –80 dB. Also shown in FIGS. 4–6 is φ as a function of time. The value of φ is a ramp function with the actual phase steps multiplied by two and the number eighty added, for the purpose of displaying the outputs on the same scale.

To drive the polarimeter models, an input signal is split in two, with one component amplitude attenuated and shifted in phase, yielding input A and B signal components. Both signal components are supplied to both polarimeter models. The digital model first digitizes the input signal components by 10 bit ADCs, at a rate equivalent to 200 MHz as a minimum. The processing operation is performed on the time and amplitude sampled signals. The null depth measure, 20log(Δ/Σ), is generated and superimposed in FIGS. 4–6 with the analog polarimeter output, which respectively illustrate the results at three input signal sampling rates: 200, 250, and 400 MHz rates.

The analog model consistently produces a null depth of –54 dB. The illustration in FIG. 4 shows the null depth characteristics when the input signal is sampled at a near-minimum sampling rate (20×IF). The null is about –45 dB deep. In FIG. 5, the sampling rate is raised to 25×IF and a deeper null is produced (–52 dB). Finally, FIG. 6 presents the output for a case with the sampling frequency increased to 40×IF. Characteristics of the output are almost identical to that of the ideal analog polarimeter.

The signal processing technique of the present invention makes possible the implementation of an all digital polarimeter, useful in measuring polarization of an RF signal. In accordance with the present invention, the digital design becomes realizable with currently available analog-to-digital converters due to the capacity to stretch the signal parameter. The stretching and digital processing yield the required number of samples per cycle of the signal, thus effectively increasing the ADC sampling frequency. For example, a sampling rate requirement of 7.2 GHz can be satisfied with a sampling rate equal to, or even lower than, approximately 200 MHz. The lower sampling can be realized with the use of an I (in-phase) and Q (quadrature) signal sampling technique. While the exemplary embodiment has been described in connection with a particular IF (10 MHz), and certain sampling rates (20, 25 and 40 time the IF) and stretching factors (M=36), it will be understood that the present invention is not limited to any particular IF, sampling rates and stretching factors.

The digital polarimeter of the present invention is more compact, lower in weight and performs better than conventional analog polarimeters at a lower cost of manufacturing. Using commercially available digital hardware, the digital implementation makes polarimetric systems affordable to more EW systems than the more expensive conventional analog polarimeters. With the capability to lock onto an intercepted signal's polarization within one pulse repetition interval, the digital polarimeter of the present invention has much faster signal polarization tracking. Moreover, the digital polarimeter does not suffer from the cross leakage signals typically present in conventional analog polarimeters. The digital polarimetric design of the present invention also offers the potential of a more reliable system, with a greater mean time between failures.

In the exemplary embodiment, the values of $\phi$ and $\gamma$ are determined by first varying one shift register (index k) until an output saddle point is found and then varying the other shift register (index j). While this implementation has been found to be efficient, it will be understood that the present invention is not limited to any particular implementation for searching for the best values of j and k. Thus, for example, if time and computation resources allow, all possible combinations of j and k could be computed to locate the null.

It will be appreciated that the digital polarimetric system of the present invention is used in the receive line of an EW system to detect the polarization of an intercepted RF signal. Such an EW system will typically also possess another polarimeter to transmit the responsive ECM signals. The digital polarimetric system of the present invention does not restrict the transmit polarimeter to any particular design, and the transmit polarimeter may be, for example, a conventional analog polarimeter.

While the present invention has been described in the context of an EW system, the present invention is not limited to this particular application. In general, the digital polarimetric system can be used in virtually any system that requires the accurate measurement of the polarization of a received RF signal. Thus, for example, the system of the present invention could be used in radar testing, or testing of virtually any RF antenna and transmission system where polarization is of interest.

Having described preferred embodiments of a new and improved digital polarimetric system, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for measuring the polarization of a received signal, comprising:
   (a) time stretching polarization components of the received signal by representing each of a number of digital samples of the polarization components of the received signal as a plurality of time-stretched samples to produce time-stretched digital polarization components;
   (b) computing a measurement value from phase-shifted combinations of the time-stretched digital polarization components, such that phase shifts producing a minimum measurement value correspond to the polarization of the received signal.

2. The method of claim 1, wherein the measurement value is a difference/sum ratio of phase-shifted combinations of the time-stretched digital polarization components, and the minimum measurement value is a null value of the difference/sum ratio.

3. The method of claim 2, wherein the null value of the difference/sum ratio corresponds to phase values $\phi$ and $\gamma$, wherein a phase and amplitude difference between the polarization components of the received signal are a function of phase values $\phi$ and $\gamma$.

4. The method of claim 3, wherein the time-stretched samples of the time-stretched digital polarization components are stored in memory, and wherein the phase values $\phi$ and $\gamma$ are respectively represented by integer numbers of memory location shifts.

5. The method of claim 1, further comprising:
   (c) sampling the polarization components of the received signal to generate the digital samples.

6. The method of claim 1, wherein (a) includes storing each of the digital samples of the polarization components of the received signal in a plurality of memory locations to form time-stretched sequences of digital samples representing the time-stretched digital polarization components.

7. The method of claim 1, wherein an effective phase resolution of the time-stretched digital polarization components is greater than that of the digital samples of the polarization components.

8. The method of claim 1, wherein a phase resolution of the time-stretched digital polarization components is a function of a sampling rate of the polarization components of the received signal and a number of memory locations in which each of said number of samples is stored.

9. The method of claim 1, wherein the digital samples of the polarization components comprise N samples per signal cycle, where N is a positive number, and wherein (a) includes storing each of the N samples in M memory locations, such that M×N samples are stored for each signal cycle, where M is a positive integer.

10. The method of claim 1, wherein the polarization components of the received signal are horizontal and vertical polarization components.

11. The method of claim 1, wherein the time-stretched digital polarization components include first and second time-stretched polarization components, and (b) includes:
   (b1) shifting samples of the first time-stretched polarization component by k sample positions to produce a time-shifted first polarization component, where k is an integer;
   (b2) adding samples of the time-shifted first polarization component to samples of the second time-stretched polarization component to produce a first sum signal;
   (b3) shifting samples of the first sum signal by j sample positions to produce a time-shifted first sum signal, where j is an integer;
   (b4) subtracting samples of the time-shifted first polarization component from samples of the second time-stretched polarization component to produce a first difference signal;
   (b5) adding samples of the first difference signal to samples of the time-shifted first sum signal to produce an output sum signal;
   (b6) subtracting samples of the time-shifted first sum signal from samples of the first difference signal to produce an output difference signal;
   (b7) computing a difference/sum ratio from a ratio of a sum of the samples of the output difference signal to a sum of the samples of the output sum signal.

12. The method of claim 11, wherein values of j and k producing a minimum difference/sum ratio represent numbers of memory location shifts corresponding to phase values that indicate polarization phase and amplitude information.

13. The method of claim 11, wherein (b) includes determining the minimum difference/sum ratio by:
(b8) setting j and k to initial values;
(b9) holding j constant while incrementing k by an integer value until an initial minimum value of the difference/sum ratio is reached; and
(b10) holding k to the value producing the initial minimum value of the difference/sum ratio while incrementing j by an integer value until a minimum value of the difference/sum ratio is reached.

14. The method of claim 11, wherein j and k are initiated and successively updated in accordance with a predetermined scheme for identifying a minimum value of the difference/sum ratio.

15. The method of claim 11, wherein initial values of j and k are estimated based upon values of j and k from previous calculations of a minimum value of the difference/sum ratio.

16. The method of claim 11, wherein initial values of j and k are estimated using a phase detector.

17. An apparatus for measuring the polarization of a received signal, comprising:
an analog-to-digital converter configured to digitally sample polarization components of the received signal;
a memory device configured to store each of a number of digital samples of the polarization components in plural memory locations, thereby representing each of the digital samples as a plurality of time-stretched samples forming time-stretched digital polarization components; and
a processor configured to compute a measurement value from phase-shifted combinations of the time-stretched digital polarization components, such that phase shifts producing a minimum measurement value correspond to the polarization of the received signal.

18. The apparatus of claim 17, wherein:
said analog-to-digital converter samples the polarization components of the received signal at a sampling rate of N samples per signal cycle, where N is a positive number; and
said memory device stores each of the N samples in M memory locations, such that M×N samples are stored for each signal cycle, where M is a positive integer.

19. The apparatus of claim 17, wherein the measurement value is a difference/sum ratio of phase-shifted combinations of the time-stretched digital polarization components, and the minimum measurement value is a null value of the difference/sum ratio.

20. The apparatus of claim 19, wherein the null value of the difference/sum ratio corresponds to phase values $\phi$ and $\gamma$, wherein a phase and amplitude difference between the polarization components of the received signal are a function of phase values $\phi$ and $\gamma$.

21. The apparatus of claim 20, wherein the phase values $\phi$ and $\gamma$ are respectively represented by integer numbers of memory location shifts.

22. The apparatus of claim 17, wherein an effective phase resolution of the time-stretched digital polarization components is greater than that of the digital samples of the polarization components.

23. The apparatus of claim 17, wherein a phase resolution of the time-stretched digital polarization components is a function of a sampling rate of the analog-to-digital converter and a number of memory locations in which each of said number of samples is stored.

24. The apparatus of claim 17, wherein the polarization components of the received signal are horizontal and vertical polarization components.

25. The apparatus of claim 17, wherein the time-stretched digital polarization components include first and second time-stretched polarization components, and said processor is configured to:
shift samples of the first time-stretched polarization component by k sample positions to produce a time-shifted first polarization component, where k is an integer;
add samples of the time-shifted first polarization component to samples of the second time-stretched polarization component to produce a first sum signal;
shift samples of the first sum signal by j sample positions to produce a time-shifted first sum signal, where j is an integer;
subtract samples of the time-shifted first polarization component from samples of the second time-stretched polarization component to produce a first difference signal;
add samples of the first difference signal to samples of the time-shifted first sum signal to produce an output sum signal;
subtract samples of the time-shifted first sum signal from samples of the first difference signal to produce an output difference signal; and
compute a difference/sum ratio from a ratio of a sum of the samples of the output difference signal to a sum of the samples of the output sum signal.

26. The apparatus of claim 25, wherein values of j and k producing a minimum difference/sum ratio represent numbers of memory location shifts corresponding to phase values that indicate polarization phase and amplitude information.

27. The apparatus of claim 25, wherein said processor determines the minimum difference/sum ratio by:
setting j and k to initial values;
holding j constant while incrementing k by an integer value until an initial minimum value of the difference/sum ratio is reached; and
holding k to the value producing the initial minimum value of the difference/sum ratio while incrementing j by an integer value until a minimum value of the difference/sum ratio is reached.

28. The apparatus of claim 25, wherein said processor initiates and updates values of j and k in accordance with a predetermined scheme for identifying a minimum value of the difference/sum ratio.

29. The apparatus of claim 25, wherein said processor estimates initial values of j and k based upon values of j and k from previous calculations of a minimum value of the difference/sum ratio.

30. The apparatus of claim 25, further comprising a phase detector configured to measure phase information relating to the polarization components of the received signal, wherein said processor estimates initial values of j and k based on measurements of said phase detector.

31. The apparatus of claim 17, wherein said apparatus is a digital polarimeter.

32. An apparatus for measuring the polarization of a received signal, comprising:
means for digitally sampling polarization components of the received signal;
means for storing each of a number of digital samples of the polarization components in plural memory locations, thereby representing each of the digital samples as a plurality of time-stretched samples to form time-stretched digital polarization components; and means for computing a measurement value from phase-shifted combinations of the time-stretched digital polarization components, such that phase shifts producing a minimum measurement value correspond to the polarization of the received signal.

33. The apparatus of claim 32, wherein:

said means for digitally sampling samples the polarization components of the received signal at a sampling rate of N samples per signal cycle, where N is a positive number; and said means for storing stores each of the N samples in M memory locations, such that M×N samples are stored for each signal cycle, where M is a positive integer.

34. The apparatus of claim 32, wherein the measurement value is a difference/sum ratio of phase-shifted combinations of the time-stretched digital polarization components, and the minimum measurement value is a null value of the difference/sum ratio.

35. The apparatus of claim 32, wherein the null value of the difference/sum ratio corresponds to phase values $\phi$ and $\gamma$, wherein a phase and amplitude difference between the polarization components of the received signal are a function of phase values $\phi$ and $\gamma$.

36. The apparatus of claim 35, wherein the phase values $\phi$ and $\gamma$ are respectively represented by integer numbers of memory location shifts.

37. The apparatus of claim 32, wherein an effective phase resolution of the time-stretched digital polarization components is greater than that of the digital samples of the polarization components.

38. The apparatus of claim 32, wherein a phase resolution of the time-stretched digital polarization components is a function of a sampling rate of the means for sampling and a number of memory locations in which each of said number of samples is stored.

39. The apparatus of claim 32, wherein the polarization components of the received signal are horizontal and vertical polarization components.

40. The apparatus of claim 32, wherein the time-stretched digital polarization components include first and second time-stretched polarization components, and said means for computing includes:

means for shifting samples of the first time-stretched polarization component by k sample positions to produce a time-shifted first polarization component, where k is an integer;

means for adding samples of the time-shifted first polarization component to samples of the second time-stretched polarization component to produce a first sum signal;

means for shifting samples of the first sum signal by j sample positions to produce a time-shifted first sum signal, where j is an integer;

means for subtracting samples of the time-shifted first polarization component from samples of the second time-stretched polarization component to produce a first difference signal;

means for adding samples of the first difference signal to samples of the time-shifted first sum signal to produce an output sum signal;

means for subtracting samples of the time-shifted first sum signal from samples of the first difference signal to produce an output difference signal; and means for computing a difference/sum ratio from a ratio of a sum of the samples of the output difference signal to a sum of the samples of the output sum signal.

41. The apparatus of claim 40, wherein values of j and k producing a minimum difference/sum ratio represent numbers of memory location shifts corresponding to phase values that indicate polarization phase and amplitude information.

42. The apparatus of claim 40, wherein said means for computing determines the minimum difference/sum ratio by:

setting j and k to initial values;

holding j constant while incrementing k by an integer value until an initial minimum value of the difference/sum ratio is reached; and holding k to the value producing the initial minimum value of the difference/sum ratio while incrementing j by an integer value until a minimum value of the difference/sum ratio is reached.

43. The apparatus of claim 40, wherein said means for computing initiates and updates values of j and k in accordance with a predetermined scheme for identifying a minimum value of the difference/sum ratio.

44. The apparatus of claim 40, wherein said means for computing estimates initial values of j and k based upon values of j and k from previous calculations of a minimum value of the difference/sum ratio.

45. The apparatus of claim 32, wherein said apparatus is a digital polarimeter.

46. A digital polarimetric system for determining the polarization of a received signal, comprising:

an analog-to-digital converter configured to digitally sample the received signal;

a memory device receiving digital samples from said analog-to-digital converter and storing each of the digital samples in a plurality of memory locations to form a time-stretched sequence of digital samples; and a processor configured to determine the polarization of the received signal from the time-stretched sequence of digital samples.

47. The digital polarimetric system of claim 40, wherein a phase resolution of the time-stretched sequence of digital samples is a function of a sampling rate of said analog-to-digital converter and a number of memory locations in which each of the digital samples is stored in said memory device.

48. The digital polarimetric system of claim 46, wherein:

said system determines the polarization of the received signal within a predetermined accuracy; and said analog-to-digital converter samples the received signal at a sampling rate insufficient to determine the polarization of the received signal within the predetermined accuracy.

49. The digital polarimetric system of claim 46, wherein:

said analog-to-digital converter samples the received signal at a sampling rate of N samples per signal cycle, where N is a positive number; and said memory device stores each of the N samples in M memory locations, such that M×N samples are stored for each signal cycle, where M is a positive integer.

50. The digital polarimetric system of claim 46, wherein:

the received signal includes first and second polarization components, and said memory device stores first and second time-stretched sequences of samples corresponding to the first and second polarization components; and said digital signal processor applies phase shifts to the first and second time-stretched sequences of samples and computes a measurement value from phase-shifted combinations of the first and second time-stretched sequences of samples, such that the phase shifts producing a minimum measurement value correspond to the polarization of the received signal.

51. The digital polarimetric system of claim 50, wherein the measurement value is a difference/sum ratio of the phase-shifted combinations of the first and second time-stretched sequences of samples, and the minimum measurement value is a null value.

52. The digital polarimetric system of claim 50, wherein said processor applies the phase shifts in increments of one sample of the first and second time-stretched sequences of samples.

* * * * *